United States Patent

Martin

[15] 3,680,173
[45] Aug. 1, 1972

[54] POULTRY SHACKLE

[72] Inventor: Walter H. Martin, San Antonio, Tex.

[73] Assignee: Refrigeration Engineering Corporation, San Antonio, Tex.

[22] Filed: Dec. 4, 1970

[21] Appl. No.: 95,142

[52] U.S. Cl. ..................17/44.1, 198/179, 214/60
[51] Int. Cl. ..............................................A22c 21/00
[58] Field of Search ....17/44.1, 11; 214/60; 198/179, 198/38

[56] References Cited

UNITED STATES PATENTS

| 2,990,573 | 7/1961 | Pitts et al. | 17/44.1 |
| 2,685,706 | 8/1954 | Zebarth | 17/44.1 |
| 3,103,696 | 9/1963 | De Long | 17/44.1 |
| 925,993 | 6/1909 | Chapman | 17/44.1 |
| 3,097,391 | 7/1963 | Wayne | 17/44.1 X |
| 3,247,543 | 4/1966 | Bonuchi et al. | 17/44.1 |

Primary Examiner—Samuel Koren
Assistant Examiner—J. F. Pitrelli
Attorney—Watson, Cole, Grindle & Watson

[57] ABSTRACT

A poultry shackle adapted for suspension from an overhead conveyor to convey a plurality of poultry through a refrigerated chamber or the like and comprising a pair of support bars disposed parallel to each other in a common horizontal plane and arranged for relative spreading movement in said plane, but normally restrained by suitable latch means against spreading beyond a predetermined spacing insufficient to prevent passage between them of the knee joints of the legs of fowls inserted horizontally between said bars, so the fowls are suspended in inverted position from their knee joints. Release of the latch means permits relative spreading of the bars to discharge the fowls downwardly by gravity at a suitable discharge station along the conveyor.

7 Claims, 2 Drawing Figures

PATENTED AUG 1 1972

3,680,173

INVENTOR,
WALTER H. MARTIN

BY
Watson, Cole, Grindle & Watson
ATTORNEYS

POULTRY SHACKLE

DETAILED DESCRIPTION

Figure 1:
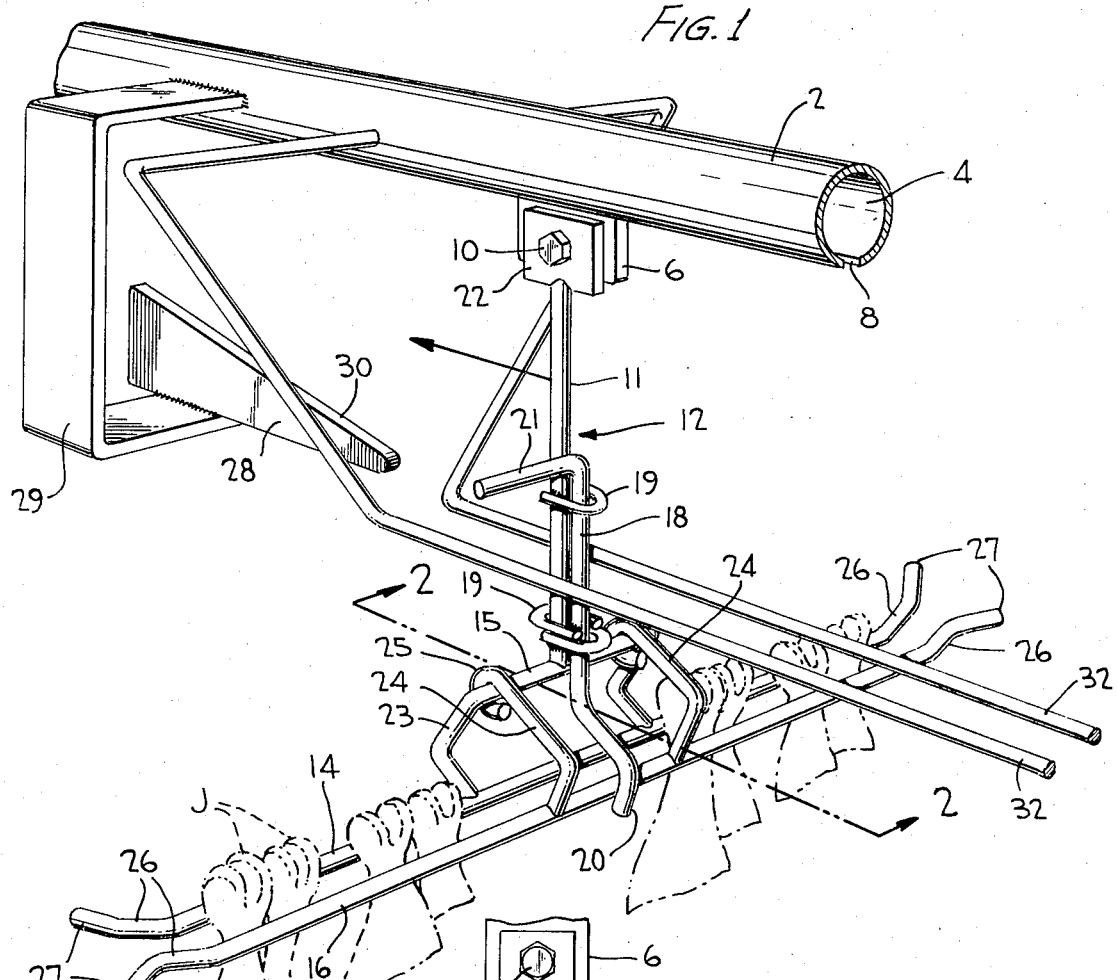

This invention relates to improvements in a poultry shackle of the type generally exemplified by the disclosure of the De Long U.S. Pat. No. 3,103,696, in which a poultry shackle carried by an overhead conveyor is provided with parallel horizontal bars spaced apart sufficiently to receive between them the upwardly directed legs of a plurality of fowls in inverted position with the knee joints of the fowls above and resting on the bars, the bars being insufficiently spaced to permit passage of the knee joints therebetween. In such arrangement, the legs of the fowls are inserted horizontally between the relatively immovable bars from either end thereof to be carried along to a suitable discharge station along the conveyor, at which time their discharge must be achieved by horizontal movement of the fowls outwardly until their legs are removed from between the parallel bars.

In accordance with the present invention, the support bars are mounted on a suitable frame for relative spreading apart in a common horizontal plane and their spreading movement is limited by a releasable latch means which normally limits their spreading beyond a distance, merely sufficient to permit the reception between them of the fowl legs and insufficient to permit downward passage of the fowl knee joints between them so that the fowl may be loaded onto the shackle by insertion of their legs horizontally between the parallel bars to be thereafter suspended by their knee joints, as in the prior art above mentioned. However, the fowl are discharged downwardly by gravity at the discharge station simply by release of the latch means which permits spreading of the bars sufficiently for the knee joints to pass between them.

In the preferred embodiment of the invention, one of the bars is fixedly secured to the rigid shackle frame, while the other bar is swingably suspended from said frame for movement about an axis above and parallel to both bars and located substantially above the first or fixed bar in a manner such that the action of gravity will normally tend to cause the swingable or movable bar to assume a position in operatively spaced relation from the first or fixed bar. In conjunction with this, a vertically movable latch means in the preferred embodiment is urged by gravity toward its operative position and is adapted to be released by suitable trip mechanism at a preselected discharge station along the path of the conveyor following which, when the shackle is carried by the conveyor through its endless circuit back to the loading station or point, both the said swingable bar and the latch will have been returned by gravity to their operative positions, so that the shackle is in condition for reloading with fowls without necessity for any manual manipulation other than the insertion of the fowls' legs between the bars.

Figure 2:
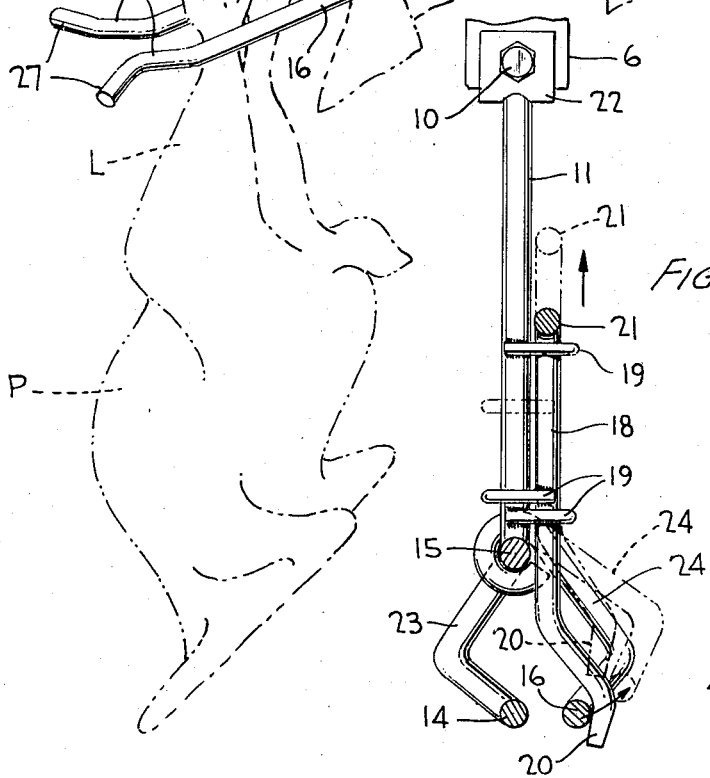

In order to promote a rapid understanding of the invention, the preferred embodiment thereof is hereinafter described in detail in conjunction with the accompanying drawing in which:

FIG. 1 is a fragmentary perspective view of a portion of an overhead conveyor from which is suspended a poultry shackle in accordance with the invention, said shackle supporting a plurality of fowl to be carried along to a suitable discharge point; and FIG. 2 is a vertical cross-section on the line 2—2 of FIG. 1, looking in the direction of the arrows and showing in broken lines the positions of the parts when in discharge or release position.

Referring now in detail to the accompanying drawing, there is illustrated in FIG. 1 a section of an endless chain conveyor of generally conventional construction including a rigid generally horizontal conveyor tube 2 through which a flexible conveyor chain 4 is disposed for movement in an endless circuit, being driven generally at a constant velocity by suitable drive means, constituting no part of the present invention and therefore not illustrated.

At suitable intervals along its length the chain 4 carries a depending lug or flight 6 which extends and is movable through a lengthwise slot 8 in the bottom of the tube 2. Suspended from each such flight 6 as by means of a bolt or other fastener 10, is the rigid vertically depending frame 11 of a poultry shackle generally designated by the numeral 12, incorporating the improved features of the present invention.

Referring first generally to its structure, the poultry shackle 12 comprises laterally separable, generally horizontal parallel first and second support bars 14 and 16, respectively, the first of which 14, is fixedly supporting from said frame 11, while the other support bar 16 is swingably suspended from said frame 11 for angular movement about an axis defined by the cross-bar 15, located above and parallel to the support bars 14 and 16, and preferably in substantial vertical registry with the first or fixed bar 14. In the normal operative position of the bars 14 and 16, it will be seen that they are disposed for relative movement through a limited operative range which is substantially and predominantly in the horizontal plane of the first or fixed support bar 14.

In the normal operative position of the support bars 14 and 16, the maximum distance or relative space between the bars is determined by a latch 18 guided for free vertical movement on the main frame 11 from a lowered normal latching position, as shown in full lines in FIGS. 1 and 2, to a raised release position as shown in broken lines in FIG. 2.

In the preferred embodiment, the latch 18 is illustrated as comprising a rod having a vertically disposed portion guided for vertical movement on the frame by means of eyelets 19 and having a laterally offset lower end 20 for operative engagement with the swingable or movable bar 16, while the upper end of the rod is bent at right angles to the remainder thereof to provide a trip arm 21.

When the latch is in its fully lowered operative latching position, its depending lower end 20 extends on the remote side of the movable support bar 16 from the fixed bar 14 at a predetermined lateral spacing from the fixed bar 14 such as to limit the separation of said bars beyond a distance substantially as shown in FIG. 1 sufficient to receive between the bars the upwardly directed legs L of poultry P shown fragmentarily and in broken lines in FIG. 1, at a location adjacent and just below the upwardly directed knee joints J thereof. The predetermined distance between the bars 14 and 16, however, is insufficient to permit downward passage between the bar of the relatively enlarged knee joints J, so that the poultry is thus suspended in upside down position with the legs thereof held between the bars 14 and 16.

In the preferred embodiment of the invention, the main carrier frame 11 of the shackle comprises a vertical suspension rod, terminating at its upper end in a plate 22 which is secured by the bolt 10 to the conveyor flight 6. The cross-bar 15 at the lower end of this rod is provided at its ends with depending arms 23, to the lower ends of which the support bar 14 is rigidly affixed, the support bar and the rod 15 being parallel to each other.

The second or movable support bar 16 is swingably suspended from the cross-bar 15 and thus from the carrier frame by means of upwardly directed relatively spaced arms 24, having their free ends in the form of eyelets 25 encircling and forming a pivotal connection with the bar 15 which thus defines an axis for relative angular movement of the bars 14 and 16, and which is parallel to the bars themselves. Between their ends, the respective bars 14 and 16 are of rectilinear configuration and truly parallel to each other, though adjacent to the ends of the respective bars there is provided an upwardly sloping retainer portion 26 for preventing accidental horizontal displacement of the poultry from between the bars. Also, to facilitate the horizontal insertion of the poultry legs between the adjacent bars 14 and 16, it is desirable that the relatively opposed free ends 27 of the bars diverge laterally with respect to each other as shown in FIG. 1.

Normally, the poultry is manually loaded on each shackle at the inception of the operative run thereof with the conveyor. Such loading is achieved by inserting the legs of the poultry horizontally between the relatively disconnected laterally spaced free ends 27—27 of the bars 14 and 16, at either end thereof, while the latch 18 is in its lowered operative position as shown in FIG. 1. The latch prevents sufficient separation between the bars 14 and 16 to permit downward movement between them of the knee joints J. However, when the latch 18 is moved upwardly to release position, the depending lower end 20 of the latch will be removed from obstructing relation with respect to the movement of the bar 16. The weight of the poultry acting through the enlarged knee joints thereof will thus cam the bars 14 and 16 apart as shown in broken lines in FIG. 2, to permit vertical downward discharge of the poultry by gravity.

It is to be noted that when the support bars 14 and 16 are operatively positioned for reception between them of the legs of poultry, the space between these bars is unobstructed throughout their length for unrestricted free reception of the fowl legs from either or both ends of the said bars, the operative depending lower end 20 of the latch being offset laterally outside of the bars to avoid interference with the placement and horizontal movement of the poultry legs between the bars.

For the purpose of automatic release of the latch means and discharge of the poultry at a preselected discharge station along the conveyor run, the trip arm 21 of the latch 18 is engaged and actuated by a stationary trip member 28, supported from the conveyor tube 2 by a bracket 29 at any suitable discharge point along the path of movement of the conveyor. The trip member 28, in the present embodiment, has an upper edge or cam surface 30 which inclines upwardly in the direction of movement of the conveyor, with its free end positioned to project beneath the trip arm 21 and to cooperate with said trip arm for fully raising and releasing the latch 18 as the trip arm approaches the rear end of the cam surface 30. The poultry P will thus be released or dropped from between the support bars 14 and 16 for reception in any suitable receptacle or on a suitable conveyor. As soon as the poultry legs have been released from between the bars 14 and 16, the bar 16 will immediately swing downwardly by gravity to substantially its normal operative position, following which the latch arm 21 will ride off the trip member 28 and on becoming disengaged therefrom, will release the latch 18, so that the latter may return by gravity to its original operative latching position. It will normally stay in this position until the shackle 12 returns through its circuit of movement with the conveyor back to the original loading point, at which time, it may be reloaded with poultry from either lateral end thereof in the manner earlier described, for a further cycle of operation.

It may be desirable in certain installations, to provide a guide means for cooperation with the poultry shackle as the latter approaches the trip member 28 to prevent lateral swinging or displacement of the depending shackle and thus to ensure that the trip arm 21 will operatively engage the trip member. Such guide means, as illustrated in FIG. 1, comprises the parallel rails 32-32 fixedly supported from the tube 2, to define an elongated space through which the depending frame of the shackle is guided toward the trip member 22.

It is to be understood that the drawings and description herein are in all cases to be interpreted as merely illustrative of the principles of the invention, rather than as limiting the same in any way, since it is contemplated that various changes may be made in the various elements to achieve like results without departing from the spirit of the invention or the scope of the appended claims.

Having thus described my invention, I claim:

1. An automatically releasable poultry shackle to be suspended from and transported by a generally horizontally moving conveyor comprising:

a rigid vertically extending frame adapted at its upper end for connection to said conveyor;

a first horizontal support bar rigidly affixed to the lower end of said frame;

a second horizontal support bar;

means supporting said second horizontal support bar from said rigid frame for angular movement substantially in the horizontal plane of said first support bar toward and away from the first support bar about an axis parallel to both said bars; said bars normally being spaced apart a predetermined distance sufficient to receive between them the legs of poultry to be carried by said shackle, but insufficient to permit passage therebetween of the knee joints of said legs; and a latch mounted on said rigid frame for free vertical movement between a normal operative lowered position in which it permits relative movement of said second support bar away from the first support bar only for said predetermined distance and a raised release position in which it permits movement of said second bar away from the said first bar beyond said predetermined distance, said latch being urged toward and normally maintained in its operative lowered position by gravity; said bars being coextensive in length and the said predetermined space between said bars being unobstructed for reception of the poultry legs.

2. An automatically releasable poultry shackle as defined in claim 1, wherein said vertically extending frame comprises a vertically disposed rod having means at the upper end thereof adapting it for connection to said conveyor; a horizontal cross bar fixedly connected to the lower end of said rod; legs depending from and rigidly connected to said cross bar, said first support bar being fixedly connected to the depending ends of the respective legs; said means supporting said second horizontal support bar from said frame, comprising a pair of arms connected to said second support bar in spaced relation along the length thereof, said arms extending upwardly and being pivotally connected to said cross-bar.

3. An automatically releasable poultry shackle as defined in claim 2, wherein said latch comprises a rigid rod guided for limited vertical movement on said frame, the lower end of said rod, when operatively positioned, being disposed on the remote side of said second support bar from said first support bar, whereby to limit the movement of the second bar away from the first bar.

4. An automatically releasable poultry shackle as defined in claim 3, wherein said latch arm projects horizontally from said rod for cooperating engagement with a trip member in the form of a cam element, supported from said conveyor adjacent the path of movement of said shackle.

5. A poultry shackle comprising a frame adapted for transport by a conveyor moving through an endless circuit, comprising:
a pair of elongated relatively parallel horizontal support bars supported by said frame for relative horizontal movement transverse to their lengths;
and latch means guided for free vertical movement on said frame between a normal operative lowered position in which said latch means is positioned to limit the relative spacing apart of said bars beyond a predetermined distance sufficient to receive between them the legs of poultry to be supported by said shackle, but insufficient to permit passage therebetween of the knees of said legs, and a raised release position in which said latch means permits movement apart of said bars to a distance sufficient to permit passage therebetween of the knees of said legs.

6. A poultry shackle as defined in claim 5, including means operatively responsive to movement of said shackle with the conveyor for raising said latch means to its release position to permit relative movement apart of said bars beyond their said predetermined spacing.

7. A poultry shackle as defined in claim 5, in which one of said bars is affixed to the frame, the other said bar being swingably supported from said frame for angular movement about an axis above and parallel to said one bar, whereby the action of gravity will urge said other bar toward said one bar.

* * * * *